United States Patent [19]

Dushkes

[11] Patent Number: 4,780,776
[45] Date of Patent: Oct. 25, 1988

[54] AIR FLOW SYSTEM IN A DATA RECORDING DISK FILE

[75] Inventor: Sherman Z. Dushkes, Redwood City, Calif.

[73] Assignee: International Business Machines Corporation, Armonk, N.Y.

[21] Appl. No.: 40,660

[22] Filed: Apr. 20, 1987

[51] Int. Cl.$^4$ .......................................... G11B 5/012
[52] U.S. Cl. .................................................. 360/98
[58] Field of Search ................................. 360/97–99, 360/133, 86

[56] References Cited

U.S. PATENT DOCUMENTS

| | | | |
|---|---|---|---|
| 4,285,018 | 8/1981 | Mulvany et al. | 360/98 |
| 4,317,146 | 2/1982 | Gervais | 360/98 |
| 4,367,502 | 1/1983 | Iftikar et al. | 360/98 |
| 4,369,475 | 1/1983 | Ho et al. | 360/97 |
| 4,412,261 | 10/1983 | Tateyama et al. | 360/98 |
| 4,471,395 | 9/1984 | Beck et al. | 360/98 |
| 4,488,193 | 12/1984 | Davis et al. | 360/98 |
| 4,581,668 | 4/1986 | Campbell | 360/97 |
| 4,680,656 | 7/1987 | Marzke et al. | 360/98 |

FOREIGN PATENT DOCUMENTS

| | | | |
|---|---|---|---|
| 0140567 | 11/1981 | Japan | 360/98 |
| 0159877 | 12/1981 | Japan | 360/97 |
| 0151893 | 7/1986 | Japan | 360/97 |
| 0198485 | 9/1986 | Japan | 360/98 |
| 61-280090 | 12/1986 | Japan . | |

OTHER PUBLICATIONS

J. L. Beck et al., "Auxiliary Internal Recirculating Airflow System", IBM Technical Disclosure Bulletin, vol. 27, No. 10A (Mar. 1985), pp. 5587–5588.

E. Lennemann et al., "Cooling of a Voice Coil Motor for Disk Storages", IBM Technical Disclosure Bulletin; vol. 15, No. 9 (Feb. 1973), pp. 2873–2874.

S. Z. Dushkes et al., "Hybrid Air System", IBM Technical Disclosure Bulletin, vol. 21, No. 6 (Nov. 1978), p. 2514.

A. R. Hearn, et al. "Cooling System for Disk File Head Actuator", IBM Technical Disclosure Bulletin, vol. 25, No. 6 (Nov. 1982), pp. 2908–2909.

Primary Examiner—Stuart N. Hecker
Assistant Examiner—David J. Severin
Attorney, Agent, or Firm—Thomas R. Berthold

[57] ABSTRACT

An improved air flow system in a sealed data recording disk file directs selected portions of the air flow from the periphery of the stack of rotating disks to specific heat generating components in the disk file. A converging duct is attached to the disk file housing and has its inlet located in close proximity to the periphery of the rotating disks. The outlet of the converging duct is located adjacent to the voice coil motor (VCM) actuator and oriented such that the flow exiting the outlet is perpendicular to the linear path of the VCM. The outlet of the duct has an area smaller than that of the inlet so that there is an increase in velocity of the exiting air, which increases the cooling rate of the VCM. The converging duct includes a shield which is located adjacent the duct inlet and curved to coincide generally with the periphery of the disks in the disk stack. The shield directs a second portion of the air flow from the periphery of the disks across the electronic read/write modules located on the arms which support the read/write heads. The air flowing across the electronic modules is prevented from flowing perpendicular to the linear path of the VCM and is combined with the flow which has passed across the VCM. The air which has combined after passing across the VCM and the electronic modules is then passed through a filter where any particulate matter is removed. After exiting the filter, the air is directed through a channel and up through the disk stack hub for recirculation by the rotating disks. The portion of air from the rotating disks which is not directed into the inlet of the converging duct or through the opening in the shield attached to the converging duct spirals down the interior walls of the disk file housing and is recombined with the air from the channel for passage up through the disk stack hub.

10 Claims, 2 Drawing Sheets

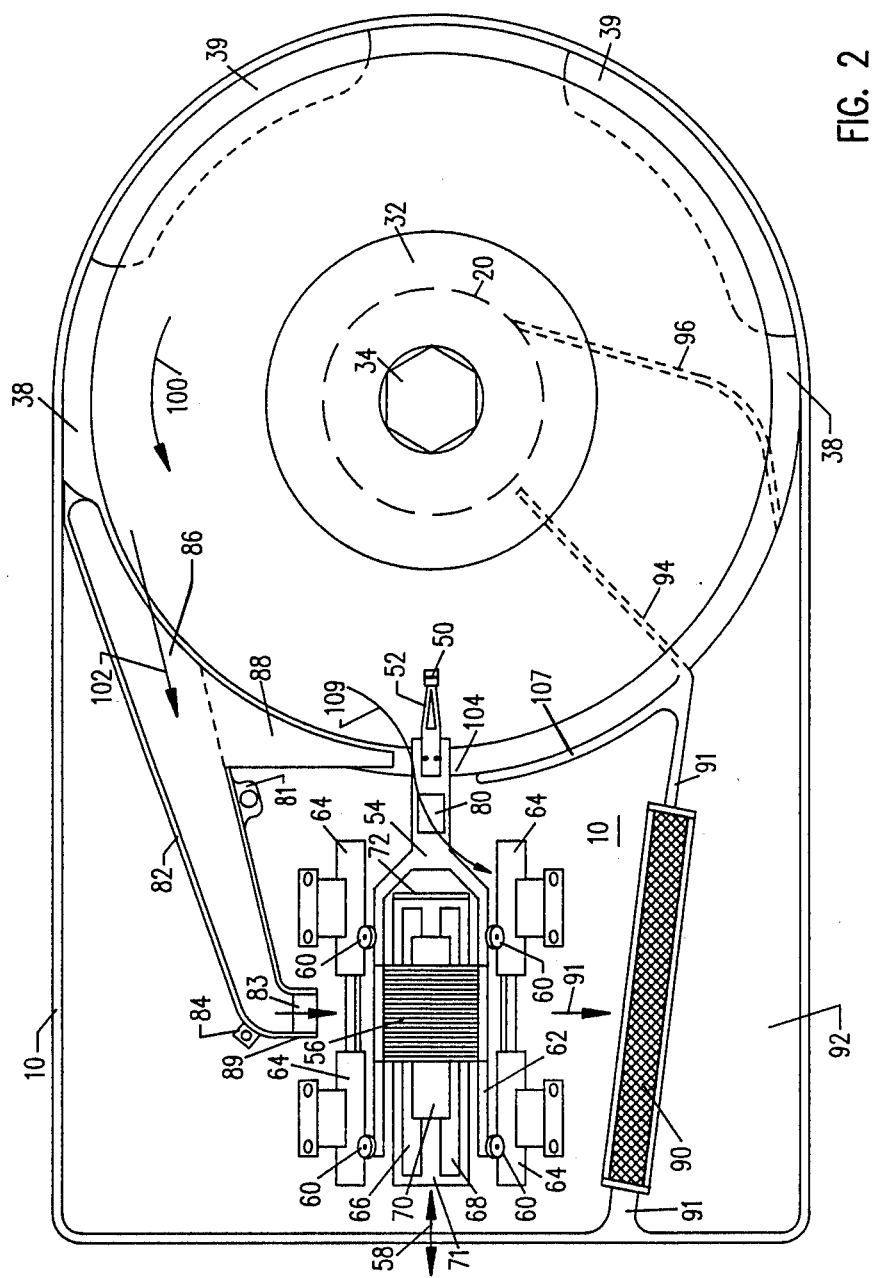

AIR FLOW SYSTEM IN A DATA RECORDING DISK FILE

TECHNICAL FIELD

This invention relates to sealed data recording disk files in which air is recirculated within the disk file by the pumping action of the rotating disk, and in particular to an improved air flow system in such disk files for cooling various heat generating devices within the disk file.

BACKGROUND OF THE INVENTION

Conventional data recording disk files utilize one or more rotatable disks with concentric data tracks, one or more heads for reaching or writing data onto the various tracks, and an actuator connected by a support arm assembly to the heads for moving the heads to the desired tracks and maintaining them over the track centerlines during read or write operations. The disks are mounted in a stack on a spindle, which includes a rotatable shaft, a bearing assembly supporting the shaft to the disk file frame or base plate, and a hub located at the end of the shaft. In certain disk files the disk file housing, which typically includes the base plate and a cover plate, is generally sealed and air within the housing is circulated by the pumping action of the rotating disks. In these disk files the hub has a plurality of apertures and the disks are separated by disk spacers which contain openings communicating with the apertures. As the disks rotate, air is drawn through the hub apertures and disk spacer openings, out across the disk surfaces and expelled at the periphery of the disks. The air from the periphery of the disks is then directed back to the bottom of the hub for recirculation.

The actuator in conventional data recording disk files is typically a "voice coil motor" (VCM) which comprises a coil movable through the magnetic field of a permanent magnetic stator. The application of current to the VCM causes the coil, and thus the attached heads, to move radially to access the concentric data tracks on the disks. The read/write circuitry which is electrically connected to the heads is typically contained in electronic modules which are required to be mounted close to the heads, such as on the support arm connecting the heads to the actuator. In sealed disk files, because both the coil of the VCM and the electornic modules are sources of heat, they must be efficiently cooled by the air recirculated by the pumping action of the rotating disks. Conventional sealed disk files do not confine or direct the air flow from the periphery of the disks to any specific component within the disk file, but merely allow the air to flow across the arm and coil in a direction which, in the case of linear VCMs, is generally parallel to the linear path of the coil. The flow of the air in this manner does not efficiently cool the electronic modules and coil and in fact generates a relatively low frequency bias force, referred to as "windage", which is continually acting on the coil. This force causes the heads to be maintained off track during read or write operations and must thus be effectively compensated by the disk file servo control system to maintain the heads directly over the track centerlines.

SUMMARY OF THE INVENTION

The invention is a means for directing selected portions of the air flow from the periphery of the rotating disks to specific heat generating components in the disk file. In a preferred embodiment a converging duct is attached to the disk file housing and has its inlet located in close proximity to the periphery of the rotating disks. The outlet of the converging duct is located adjacent to the coil of the VCM, and oriented such that the flow exiting the outlet is perpendicular to the linear path of the coil. Because the outlet of the duct has an area smaller than that of the inlet, the converging duct causes an increase in velocity of the air and thus increases the cooling rate of the coil. In addition, because the air is flowing generally perpendicularly to the linear path of the coil, "windage" is substantially reduced, thereby improving the performance of the servo control system during read or write operations. The converging duct also includes a shield which is located adjacent the inlet and curved to coincide generally with the periphery of the disks in the disk stack. The shield directs a second portion of the air flow from the periphery of the disks across the electronic module on the arm. The air flowing across the electronic module is prevented from flowing perpendicular to the linear path of the coil and is combined with the flow which has passed across the coil. The air which has combined after passing across the coil and the electronic module is then passed through a filter where any contamination or particulate matter is removed. After exiting the filter, the air is directed through a channel back to the lower most portion of the disk stack and up through the hub for recirculation by the rotating disks.

The remaining portion of air from the rotating disks, i.e. that which is not directed into the inlet of the converging duct or through the opening in the shield attached to the converging duct, spirals down the interior walls of the disk file housing. There it is recombined with the air from the channel for passage up through the hub and back to the rotating disks.

For a fuller understanding of the nature and advantages of the present invention reference should be made to the following detailed description taken in conjunction with the accompanying drawings.

BRIEF DESCRIPTION OF THE DRAWINGS

FIG. 2 is a top-view of the disk file with the disk file cover removed and illustrating the converging duct with shield, the filter and the air return channel.

DESCRIPTION OF THE PREFERRED EMBODIMENTS

Figure 1:
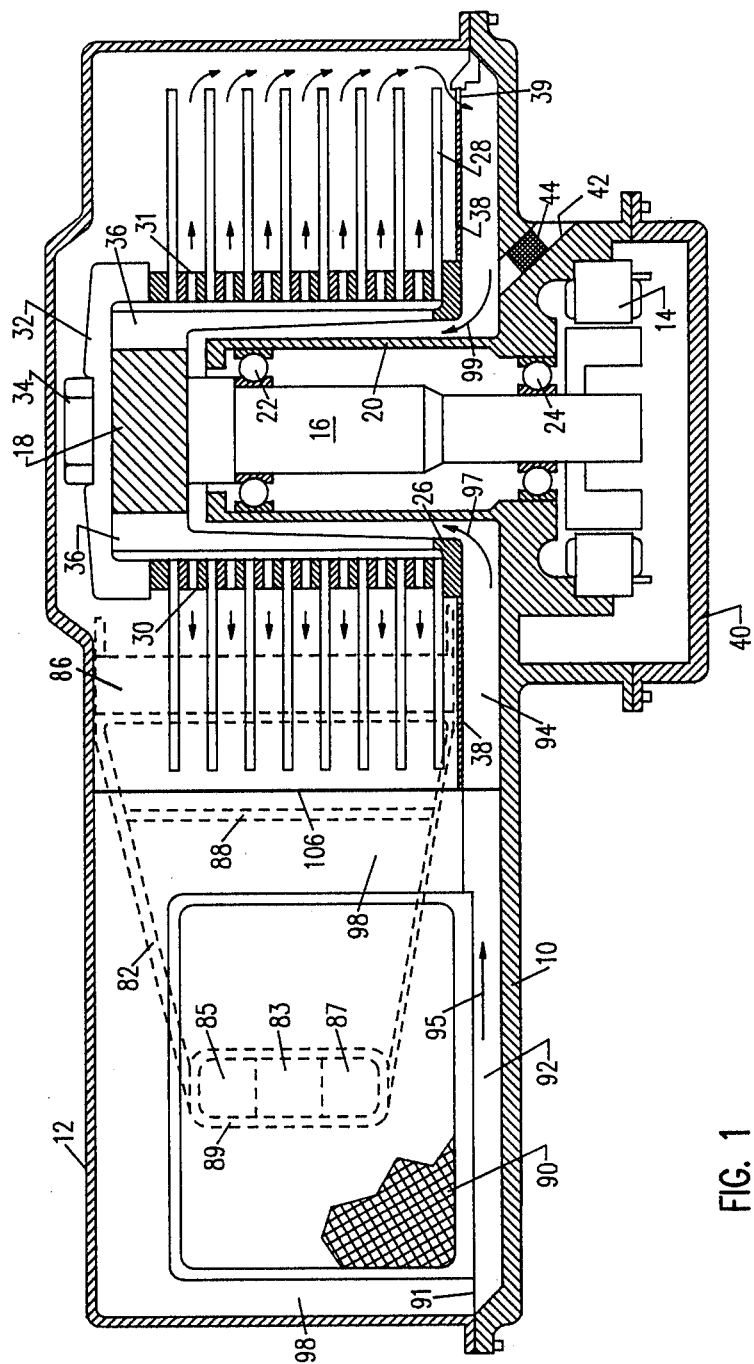
FIG. 1 is a partial sectional view of the disk file illustrating the disk stack and hub, the filter, and the converging duct in dashed line.

As illustrated in the sectional view of FIG. 1, the disk file housing includes a base plate 10 and a cover 12. A disk drive motor 14 is mounted to base plate 10 and drives a rotary shaft 16 which has a hub 18 attached to the end opposite motor 14. The shaft 16 is attached to a cylindrical portion 20 of base plate 10 by means of axially spaced bearings 22, 24. A cover plate 40 surrounds drive motor 14 and attaches to base plate 10.

The hub 18 has a lower rim 26 which supports the lower most disk 28 in a stack of axially aligned disks. Each of the disks on hub 18 is separated from adjacent disks by means of ring-like disk spacers 30 which have circumferentially spaced openings 31. An axial load is applied to all of the disks in the disk stack 16 by bolt 34. The hub 18 has axially extneding and circumferentially spaced apertures 36 which provide communication with openings 31 in disk spacers 30.

A baffle plate 38 is oriented parallel to the lower most disk 28 in the disk stack and is secured to base plate 10. The baffle plate 38 has a central opening permitting rotation of lower rim 26 of hub 18. Baffle plate 38 extends around the entire perimeter of base plate 10 and has circumferentially spaced openings 39 whose function will be described later.

The disk drive motor 14 is enclosed and generally sealed from the outside environment by means of the motor cover plate 40. Because the disk file illustrated in FIG. 1 is of the generally sealed type in which external air is not forced for circulation within the interior of the disk file housing, a breather port 42 which contains filter mateiral 44, is located within base plate 10 to provide make-up air for air which has leaked out of the housing, such as through the seal between cover 12 and base plate 10.

A top-view of the disk file with the cover 12 removed is illustrated in FIG. 2. A read/write head 50 is mounted on a suspension 52 which is attached to arm 54. Arm 54 is connected to a coil 56 which forms part of the VCM actuator. Coil 56 may be either cylindrical or rectangular but is movable in a linear direction indicated by arrow 58 by means of rollers 60 attached to the support 62 on which coil 56 is mounted. The rollers 60 move along guide rails 64 which are attached to base plate 10. The coil 56 moves through a magnetic circuit provided by lower magnets 66, 68, a central core 70 through the center of coil 56, upper magnets (not shown) and side plates (not shown) which provide a flux return path. Magnets 66, 68 are mounted to a magnet support plate 71 which is connected to base plate 10. (In the view of coil 56 and associated magnet structure, as shown in FIG. 2, the upper magnets and magnet support plate and the flux return side plates have been removed in order to show the manner in which coil 56 moves along the guide rails 64). The magnet support plates, such as plate 71, are connected to a front plate 72 which generally prevents access of air from the disks into the interior of the VCM. An electronic module 80, which contains circuitry for the rea/write channels, is electrically coupled to the read/write head 50 an disk mounted on arm 54. While in the illustration of FIG. 2, there is shown only one magnet structure and coil, and one associated arm 54 and head 50, it should be understood that in typical disk files there may be multiple arms attached to each VCM and multiple VCMs operable with the entire disk stack.

A converging duct 82 is secured to base plate 10 by means of mounting brackets 81, 84. The duct 82 extends the entire axial length of the disk stack, as shown by dashed line in FIG. 1, and is sealed against adjacent base plate 10 and the side and top walls of cover 12. The duct 82 has an attached portion which serves as a shield 88 which is generally concentric with the outer periphery of the disks in the disk stack. The shield 88 also extends the entire axial length of the disk stack. The duct 82 and attached shield 88 may be made of any suitable plastic material, such as polycarbonate.

Secured to base plate 10 is a filter 90 (FIG. 2) which has its inlet side exposed to the VCM and its outlet side exposed to a return channel 92. The return channel 92 is defined by web 91 and side walls 94, 96 extending upwardly from base plate 10, and baffle 38. The air passing from the VCM through filter 90 is required to flow into channel 92 because a wall 98 (FIG. 1) attached to the interior of cover 12 surrounds and seals the perimeter of filter 90. Wall 98 may be an internal web of the casting which forms cover plate 12. Return channel 92 provides a return path for air to hub 18, as indicated by arrows 95, 97 (FIG. 1). Thus, when cover 12 is secured to base plate 10, a vertical wall, formed by wall 98 of cover 12, filter 90 and web 91 of base plate 10, is defined between the region containing the VCM and the region containing the return channel 92.

In operation of the disk file, the rotating disks serve as a means for pumping the air which is confined to flow within the housing defined by cover 12 and base plate 10. As the disks rotate in the direction indicated by arrow 100 (FIG. 2) air is circulated upward between hub 18 and cylindrical portion 20 of base plate 10, in the direction shown by arrows 97, 99. The air is pulled through apertures 36 in hub 18, openings 31 in disk spacers 30 and out across the surfaces of the disks. As the air is expelled from the periphery of the disks a first portion is directed into the inlet 86 of conduit 82, as indicated by arrow 102. Because the inlet 86 of conduit 82 extends the axial length of the disk stack and is sealed to the walls of cover 12, air is prevented from flowing into the VCM region other than through duct 82.

A second portion of gas exiting the periphery of the disks is directed through the opening 104 which provides access for arm 54 into the disk stack area. The opening 104 is defined by the edge of shield 88 attached to duct 82, and by a web 106 (FIG. 1) extending downwardly from cover 12. The web 106 is an extension of wall 98 (FIG. 1) which surrounds filter 90. The web 106 is seated on base plate 10 in the region designated as 107 (FIG. 2). The region 107 on base plate 10 is an extension of web 91. The second portion of gas exits through opening 104 in the direction indicated generally by arrow 109 and is prevented from reaching coil 56 because of front plate 72.

The air exiting duct 82 through outlet 89 is directed across the coil 56 and into the gaps between coil 56 and lower magnets 66, 68 and upper magnets (not shown). The air passes across the coil 56 and toward filter 90, as indicated by arrow 91. Because the air is directed perpendicular to the linear path 58 of coil 56, there is no windage acting on the actuator and no corresponding necessity for the servo control system to compensate for bias forces acting on the VCM. In addition, because the duct outlet 89 has an area substantially less than the area of inlet 86 the air velocity is substantially increased, thereby increasing the cooling rate of the coil 56. Similarly, the air exiting through opening 104 cools electronic module 80 on arm 54. The separate air flows crossing coil 56 and electronic module 80 are recombined and forced to pass thorugh filter 90 because filter 90 is generally sealed to base plate 10 and walls 98 and 106 in cover 12. After this recombined air has exited filter 90 it passes into return channel 92 and back to the region between hub 18 and cylindrical portion 20 of base plate 10. Thereafter the air is again passed through apertures 36 in hub 18 and openings 31 in disk spacers 30 for recirculation by the rotating disks.

In those disk files which have multiple actuators, the outlet 89 of duct 82 may be divided into multiple outlets by the use of inserts or plugs, such as plug 83 (FIG. 2) which divides outlet 89 into separate ports 85, 87. Thus, in the embodiment shown in FIG. 2 the coil 56 is the coil of the lowermost VCM in a dual-VCM disk file and is cooled by air exiting port 87.

The remaining portion of air which exits the periphery of the disk stack, i.e. the air which does not enter duct 82 or opening 104, spirals down the interior wall of the cover 12 toward baffle plate 38. As shown by dashed lines in FIG. 2, baffle plate 38 has circumferential openings 39 near the interior wall of base plate 10 which permit the air to enter between baffle plate 38 and base plate 10. The air which has spiraled down the interior wall of cover 12 then passes up through the hub 18 where it is recombined wtih air entering the hub 18 from channel 92.

While the air flow system of the present invention has been described with reference to a generally sealed disk file which utilizes a breater port 42 for make-up air, and in which the disk drive motor 14 is generally sealed by means of a cover plate 40, the air flow system is fully applicable to hermetically sealed disk files, such as those described in U.S. Pat. No. 4,367,503, assigned to the same assignee as this application. In such hermetically sealed disk files make-up air is not required and cooling gases other than air, such as helium, may be used.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In a data recording disk file having a disk drive motor, a rotatable shaft driven by the drive motor, a hub attached to an end of the shaft, a plurality of disks mounted on the hub, a plurality of heads for reading data from or writing data to associated disk surfaces, an arm for supporting the heads, a linear voice coil motor actuator attached to the arm for moving the heads to selected tracks on the disks, and a housing supporting the disk drive motor and linear actuator and providing a generally sealed enclosure for the head/disk area of the disk file, the disk file being of the type wherein the rotating disks provide a pumping action for circulation of a cooling gas within the housing, an improvement to the disk file comprising:
   a converging duct connected to the housing and located within the generally sealed enclosure, the duct having an inlet located proximate the periphery of the disks for receiving a portion of the gas from the periphery of the rotating disks and an outlet proximate the coil of the actuator for directing said portion of gas across the coil in a direction generally perpendicular to the linear path of the coil.

2. The improvement according to claim 1 wherein the housing provides a hermetically sealed enclosure.

3. The improvement according to claim 1 further comprising a breather port in the housing for permitting the entry of make-up air into the generally sealed enclosure.

4. The improvement according to claim 1 further comprising a baffle located between the disks and the housing, the baffle having openings near the wall of the housing for the passage of a portion of the gas from the periphery of the disks back to the hub.

5. The improvement according to claim 1 wherein the disk file is also of the type having an electronic module mounted on the arm, and further comprising a shield connected to the duct for directing a second portion of gas from the periphery of the rotating disks across the electronic module.

6. The improvement according to claim 5 further comprising a filter connected to the housing filtering the gas which has flowed across the coil and electronic module, and means for directing the gas from the filter thorugh the hub and back to the disks for recirculation.

7. A data recording disk file comprising:
   a disk drive motor;
   a rotatable shaft driven by the drive motor;
   a hub attached to an end of the shaft and having a plurality of apertures therein;
   a plurality of axial-aligned disks mounted on the hub;
   a plurality of disk spacers located between the disks and having radially-directed openings providing communication with the apertures on the hub, whereby as the disks rotate a cooling gas is drawn through the hub apertures and disk spacer openings and out to the periphery of the disks;
   a plurality of heads for reading data from or writing data to the disks;
   at least one arm for supporting the heads;
   a linear voice coil motor actuator attached to the arm for moving the heads to selected tracks on the disks;
   a housing supporting the disk drive motor and linear actuator and providing a generally sealed enclosure for the head/disk area of the disk file;
   a converging duct connected to and located within the housing, the duct having an inlet for receiving a first portion of gas flowing from the periphery of the rotating disks and an outlet for directing said first portion of gas across the coil of the voice coil motor actuator in a direction generally perpendicular to the linear path of the coil;
   means for filtering all of the gas which has flowed across the coil; and
   a channel for directing the filtered gas to the hub for passage through the hub apertures and disk spacer openings for recirculation by the rotating disks.

8. The improvement according to claim 7 wherein the disk file has multiple linear voice coil motor actuators and wherein the duct includes means located near the outlet for dividing the gas into multiple outlet ports, each outlet port directing the gas to the coil of a corresponding actuator in a direction generally perpendicular to the linear path of the coil.

9. The improvement according to claim 7 further comprising:
   an electronic module mounted on the arm and electrically coupled to at least one of the heads;
   means for directing a second portion of gas flowing from the periphery of the disks across the electronic module mounted on the arm; and
   means for confining the remaining portion of gas flowing from the periphery of the disks to flow into the region of the hub for mixing with the filtered gas prior to recirculation by the rotating disks.

10. The improvement according to claim 9 wherein the confining means comprises a baffle plate oriented generally parallel to the disks and located between the disks and housing, the baffle having openings for the gas flowing adjacent the wall of the housing.

* * * * *

UNITED STATES PATENT AND TRADEMARK OFFICE
CERTIFICATE OF CORRECTION

PATENT NO. : 4,780,776
DATED : October 25, 1988
INVENTOR(S) : Sherman Z. Dushkes It is certified that error appears in the above-identified patent and that said Letters Patent is hereby corrected as shown below:

Column 1, Line 3, "reaching" should be -- reading --.

Column 2, Line 67, after "in the disk stack", insert -- by means of a disk clamp 32 which is attached to the end of shaft --.

Column 3, Line 43, "rea/write" should be -- read/write --.

Column 3, Line 44, remove "an disk" and insert -- and is --.

Signed and Sealed this

Twenty-eighth Day of March, 1989

Attest:

DONALD J. QUIGG

*Attesting Officer*   *Commissioner of Patents and Trademarks*